US010018160B2

(12) United States Patent
Bartus et al.

(10) Patent No.: US 10,018,160 B2
(45) Date of Patent: Jul. 10, 2018

(54) VARIABLE CAPACITY, CONFIGURABLE HYDROCARBON EMISSIONS TRAP

(71) Applicant: Ford Global Technologies, LLC, Dearborn, MI (US)

(72) Inventors: Chuck Frank Bartus, Grosse Ile, MI (US); Dennis Lowe, Farmington Hills, MI (US); David Ballheim, Dearborn, MI (US); Floyd Leon Bergeron, Dearborn, MI (US); John Felecan, Dearborn Heights, MI (US); Dawn Woodring, Canton, MI (US); Todd Blankenship, Ferndale, MI (US); Robert Joseph Pyle, Canton, MI (US); Dwayne Pollitt, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 15/003,445

(22) Filed: Jan. 21, 2016

(65) Prior Publication Data

US 2017/0211518 A1    Jul. 27, 2017

(51) Int. Cl.
*F02M 25/08*    (2006.01)
*F02M 33/04*    (2006.01)
*B60K 15/035*    (2006.01)

(52) U.S. Cl.
CPC ... *F02M 25/0854* (2013.01); *B60K 15/03504* (2013.01); *F02M 25/089* (2013.01); *F02M 25/0836* (2013.01); *F02M 25/0872* (2013.01); *F02M 33/04* (2013.01)

(58) Field of Classification Search
CPC .......... F02M 25/0854; F02M 25/0836; F02M 25/089; F02M 33/04; F02M 25/0872; B60K 15/03504
See application file for complete search history.

(56) References Cited

U.S. PATENT DOCUMENTS

| 6,896,852 | B1 | 5/2005 | Meiller et al. | |
| 6,928,990 | B2 | 8/2005 | Meiller et al. | |
| 7,059,306 | B2* | 6/2006 | Reddy | F02M 25/0836 |
| | | | | 123/518 |
| 7,713,337 | B2* | 5/2010 | Toyoda | F02M 25/0854 |
| | | | | 96/131 |
| 7,789,075 | B2* | 9/2010 | Makino | F02M 25/0854 |
| | | | | 123/519 |
| 8,997,719 | B2* | 4/2015 | Kosugi | B60K 15/03504 |
| | | | | 123/519 |
| 2010/0307462 | A1* | 12/2010 | Peters | F02M 25/0872 |
| | | | | 123/520 |

(Continued)

*Primary Examiner* — Jospeh Dallo
*Assistant Examiner* — Kurt Liethen
(74) *Attorney, Agent, or Firm* — Julia Voutyras; McCoy Russell LLP

(57) ABSTRACT

Methods and systems are provided for a vapor canister couple to a fuel tank of a vehicle. A series of fluidically coupled, variable capacity bleed elements, externally coupled to a sidewall of the vapor canister, capture the bleed emissions resulting from desorption of fuel vapors from an adsorbent material inside the vapor canister. The series of bleed elements may be fluidically coupled through flow paths passing through the vapor canister wall, connecting through a first flow path to a chamber inside the vapor canister and connecting through a second flow path to a vent port of the vapor canister.

19 Claims, 12 Drawing Sheets

(56) References Cited

U.S. PATENT DOCUMENTS

2013/0291839 A1   11/2013  Lin et al.
2014/0130781 A1*  5/2014  Jentz .................. F02M 25/0809
                                                              123/520
2015/0275727 A1* 10/2015  Hiltzik ............... B01D 53/0415
                                                               123/519
2016/0025019 A1*  1/2016  Pearce ............... F02M 25/0836
                                                               123/520

* cited by examiner

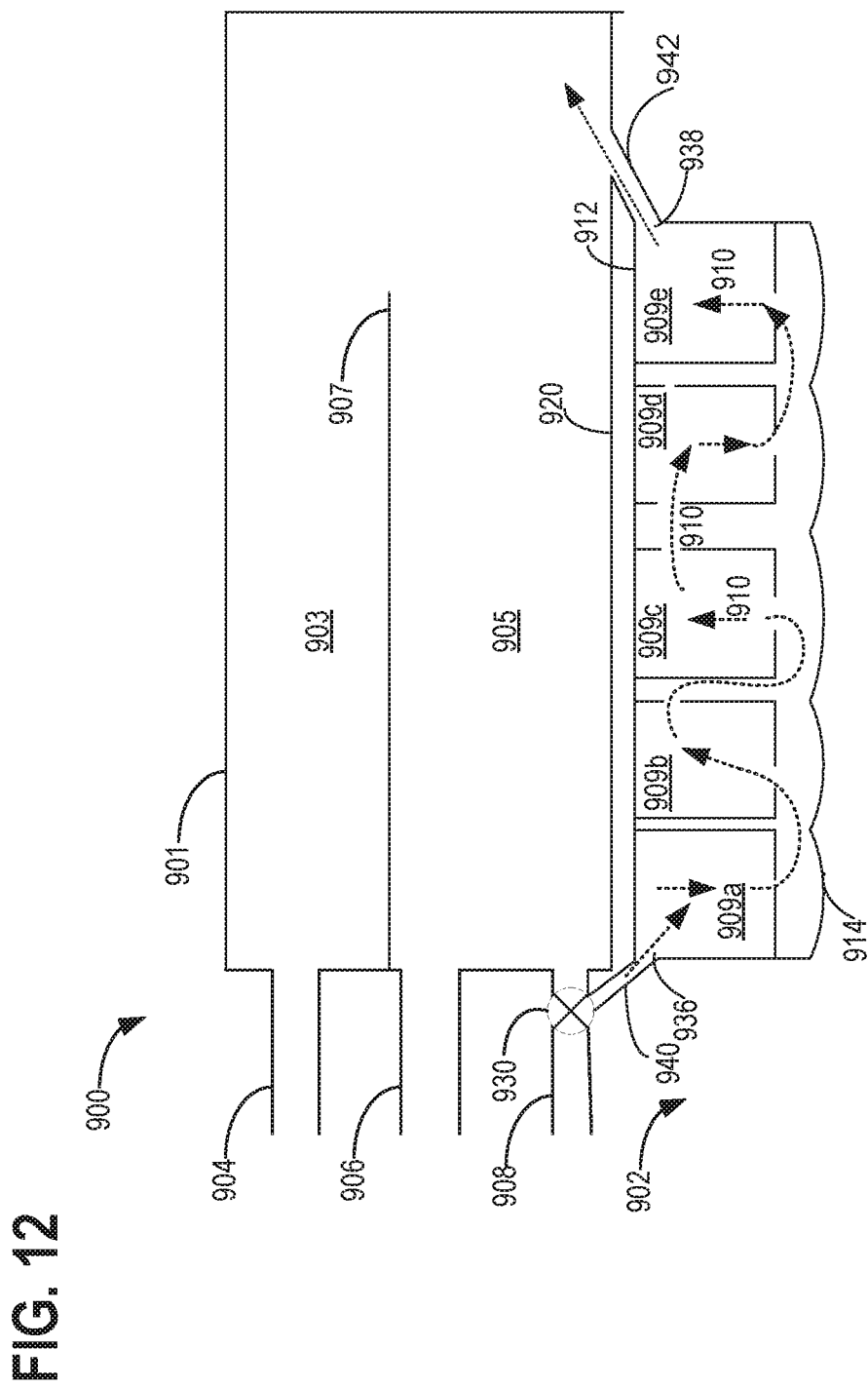

VARIABLE CAPACITY, CONFIGURABLE HYDROCARBON EMISSIONS TRAP

FIELD

The present invention relates to a system for trapping and purging bleed emissions of a hydrocarbon canister.

BACKGROUND AND SUMMARY

Vehicles may be fitted with evaporative emission control systems to reduce the release of fuel vapors to the atmosphere. Evaporative emissions control systems may include a fuel vapor canister configured to adsorb refueling, diurnal, and running loss fuel vapors. Over the course of one or more diurnal cycles, fuel vapor may become desorbed from the fuel vapor canister. The desorbed fuel vapors may travel to atmosphere, thus comprising emissions and wasting fuel.

Thus, evaporative emissions control systems may include a bleed canister, located between the main fuel vapor canister and the atmosphere, to bind the desorbed vapors. Typical vapor canisters may include a bleed canister inside the vapor canister to reduce diurnal emissions occurring during the inactive state of the vehicle. A large primary carbon bed in the vapor canister handles a majority of the fuel vapors during vehicle use and refueling, and the bleed canister close to the atmospheric vent uses an activated carbon bleed element to capture low concentration hydrocarbon vapors dining the inactive state of the vehicle from being expelled into the environment.

In one of the approaches shown in U.S. Pat. No. 6,896,852, a carbon scrubber for capturing bleed emissions from a vapor canister is mounted outside the vapor canister in a vapor conduit coupling with an atmospheric port of the vapor canister. The carbon scrubber is configured to receive and absorb the bleed emissions from the vapor canister before the vapors are released to the atmosphere through the atmospheric port.

However, the inventors herein have recognized a few issues in the above mentioned approaches. Positioning the carbon scrubber in a separate conduit increases the packaging space of the evaporative emissions control system. Further, the bleed element capacity of the carbon scrubber may be limited and may not be varied to meet more stringent emission requirements. Especially in vehicles with larger fuel tanks, the bleed element capacity may not be adequate to capture all of the bleed emissions efficiently, resulting in degradation of emissions. Further, in vapor canisters that include a bleed element section inside the vapor canister, limited packaging space is available within the vapor canister itself, and therefore, it may be desirable to eliminate the bleed element section inside the vapor canister to allow a larger volume of hydrocarbon trapping material in the primary carbon bed, without compromising on bleed element capacity.

The inventors herein have recognized the above issues and provide an approach to at least partly address them. In one example, a vapor canister includes a first port connecting to a fuel tank, a second port connecting to an engine intake, a third port connecting to atmosphere, and a series of fluidically coupled bleed element shells coupled externally to a sidewall of the vapor canister. The series of fluidically coupled bleed elements includes a first bleed element shell fluidically coupled to the third port through a first flow path passing through the sidewall of the vapor canister and to the first bleed element shell, and a last bleed element shell fluidically coupled to a chamber inside the vapor canister through a second flow path passing through the sidewall into the chamber.

In this way, by providing a series bleed element shells coupled to an outside wall of a vapor canister, adequate bleed emission trapping capacity for capturing bleed emissions from the vapor canister may be provided while preserving additional space inside the vapor canister and without increasing the packaging space of the vapor canister and associated componentry. By integrating the bleed element shells with the vapor canister sidewall and directing fuel vapors and/or fresh air between the bleed element shells and the vapor canister via flow paths within the sidewall, external components and conduits may be minimized, reducing packaging space and cost. Further, the number of bleed element shells that house adsorbent material may be easily adjusted to accommodate relatively small or relatively large expected vapor load on the vapor canister.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 12 shows a schematic of fluidic coupling between a vapor canister and a bleed element cartridge holder external to the vapor canister.

DETAILED DESCRIPTION

Figure 1:
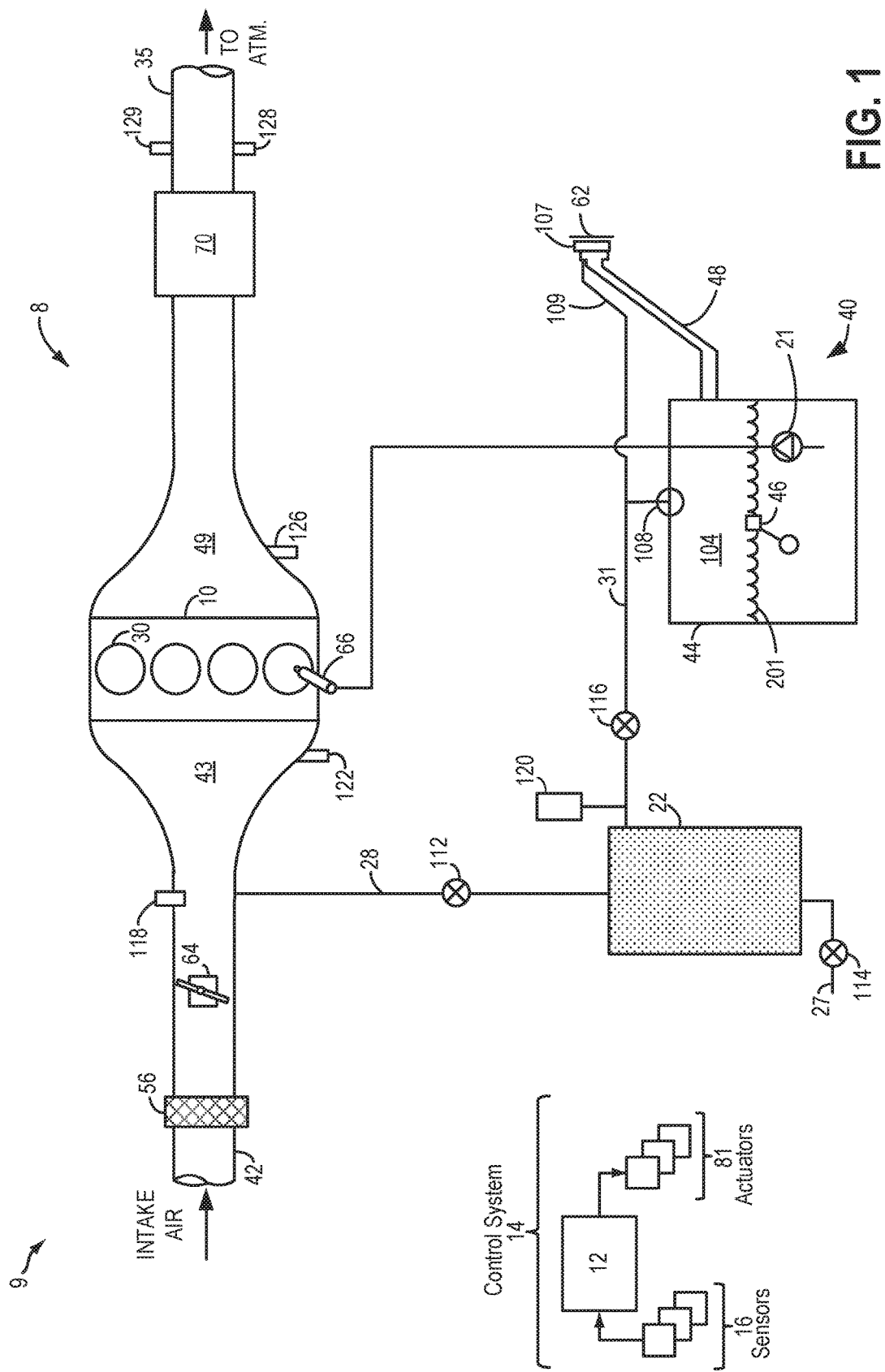
FIG. 1 schematically shows an example of an engine and an associated evaporative emission control system.
Figure 2:
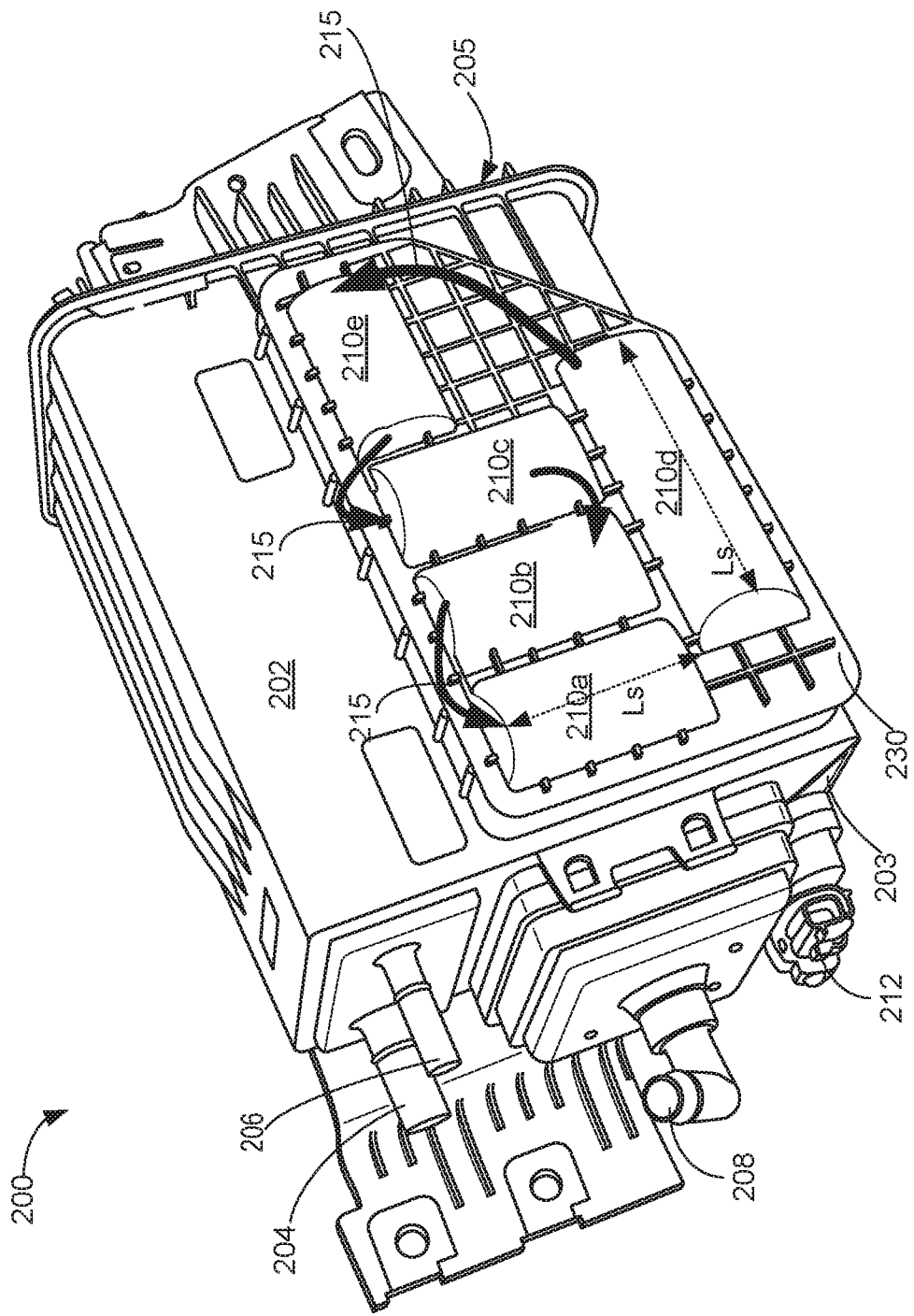
FIG. 2 shows a vapor canister with a series of fluidically coupled bleed element shells coupled to an outside wall of the vapor canister.
Figure 3:
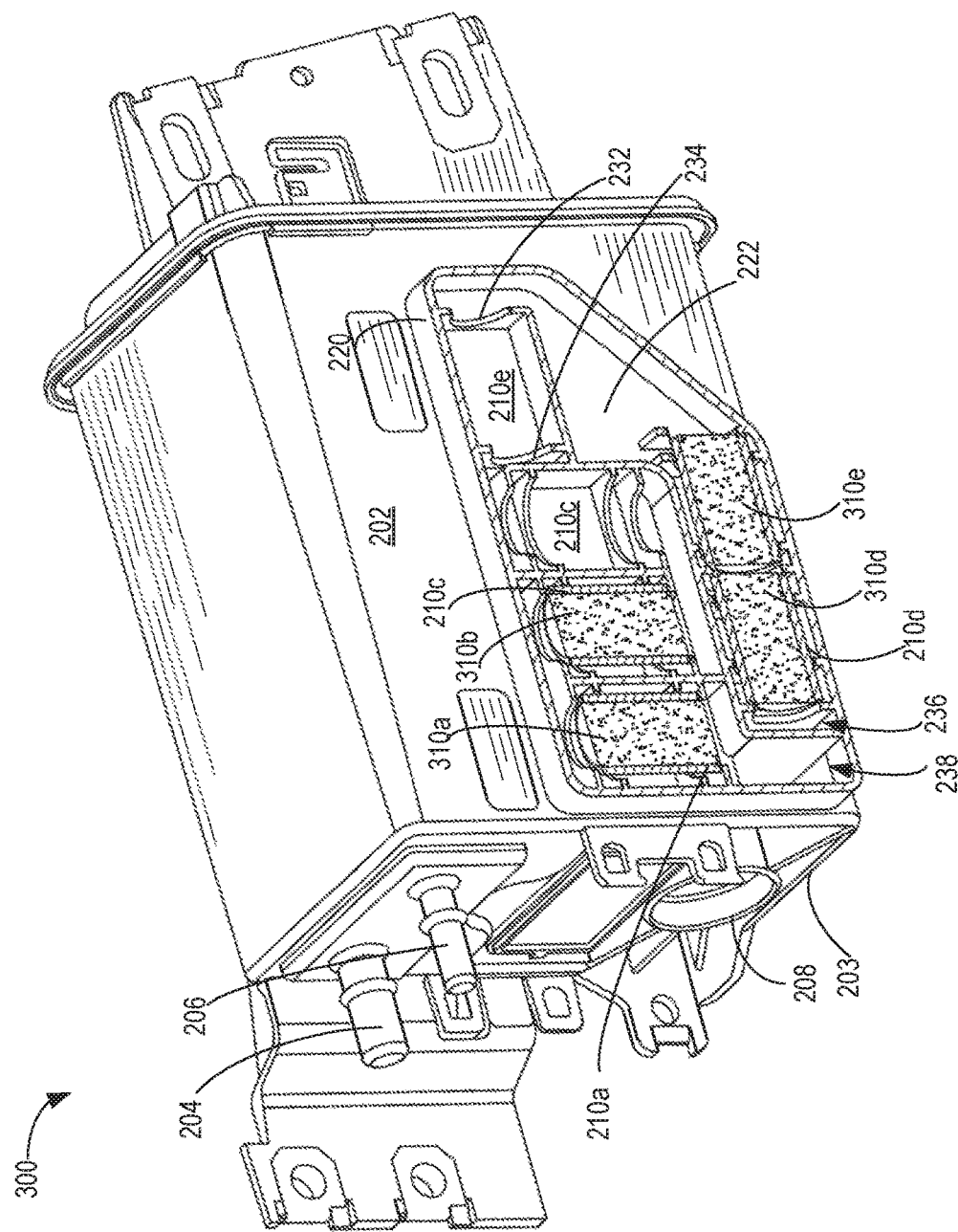
FIG. 3 shows a cross-sectional view of the bleed element shells externally coupled to the vapor canister of FIG. 2.
Figure 4:
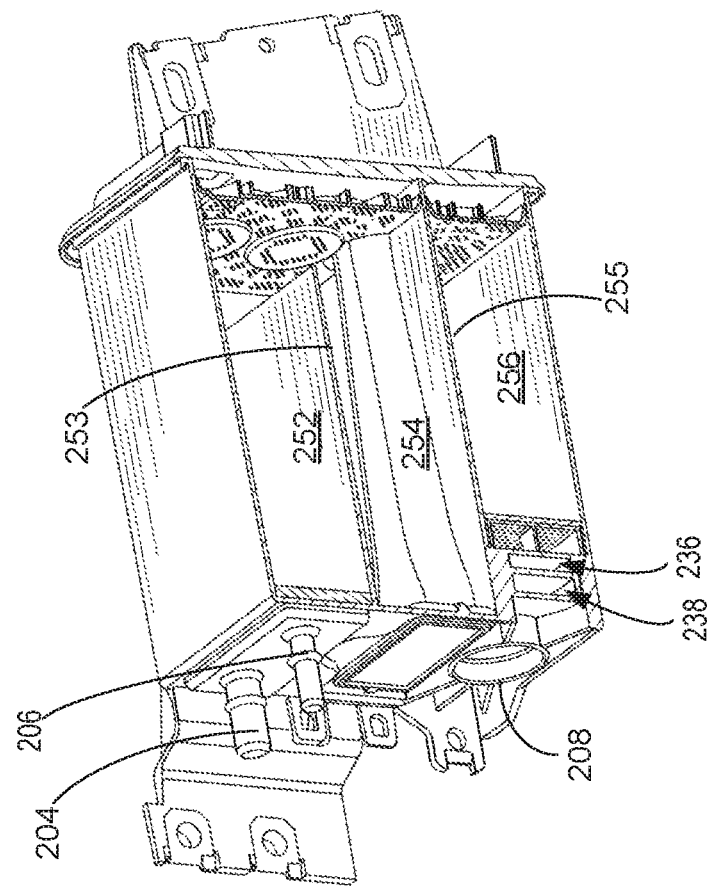
FIG. 4 shows a cross-sectional view of the vapor canister of FIG. 2 with three chambers.
Figure 5:
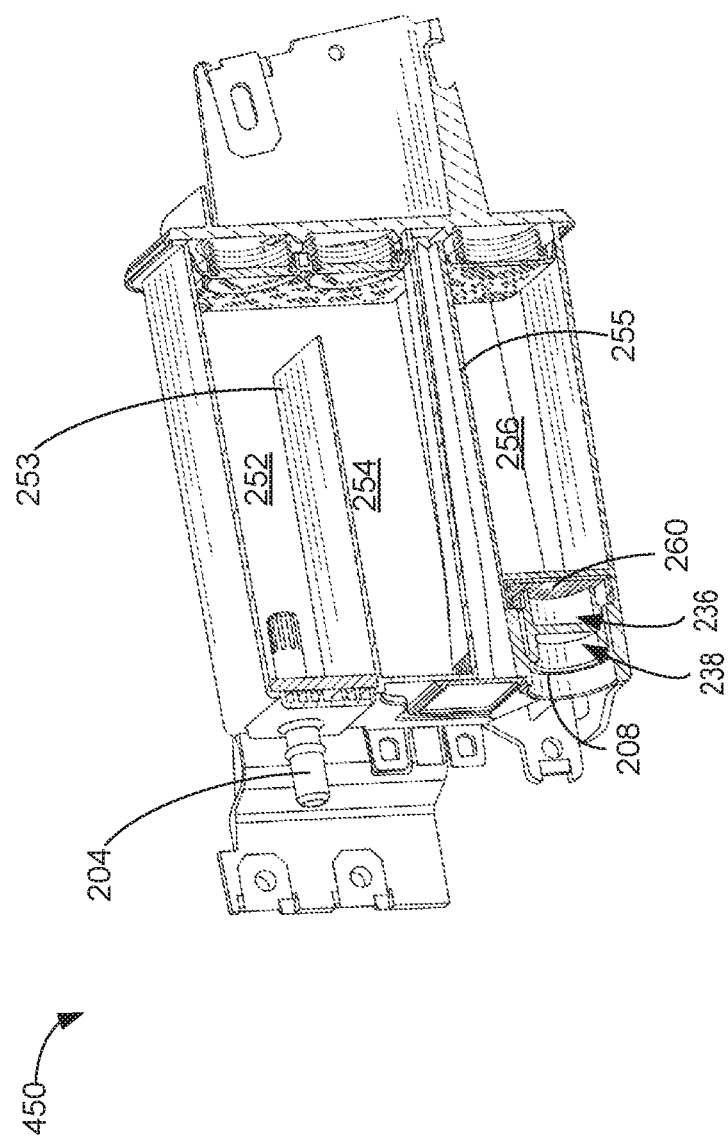
FIG. 5 shows another cross-sectional view of the vapor canister of FIG. 2.
Figure 7:
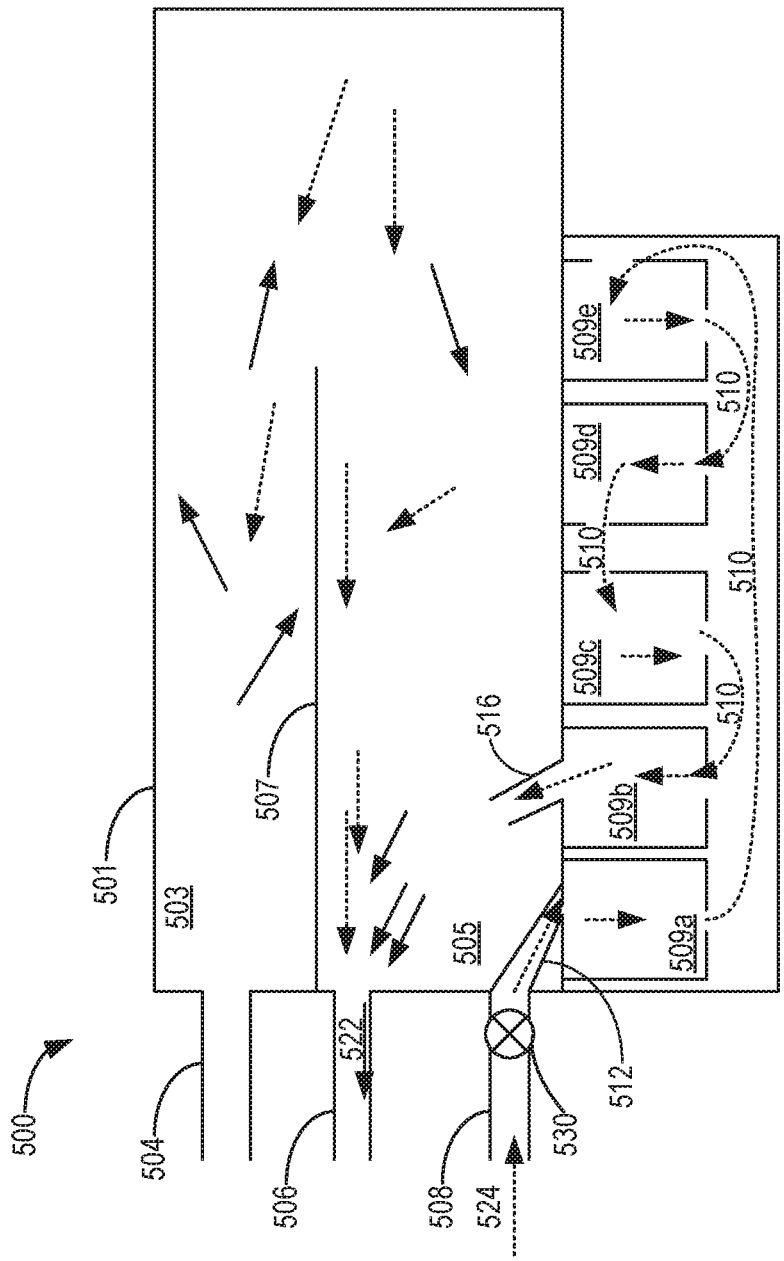
FIG. 7 shows a schematic of example flow paths through a vapor canister during fuel vapor purging mode.
Figure 8:
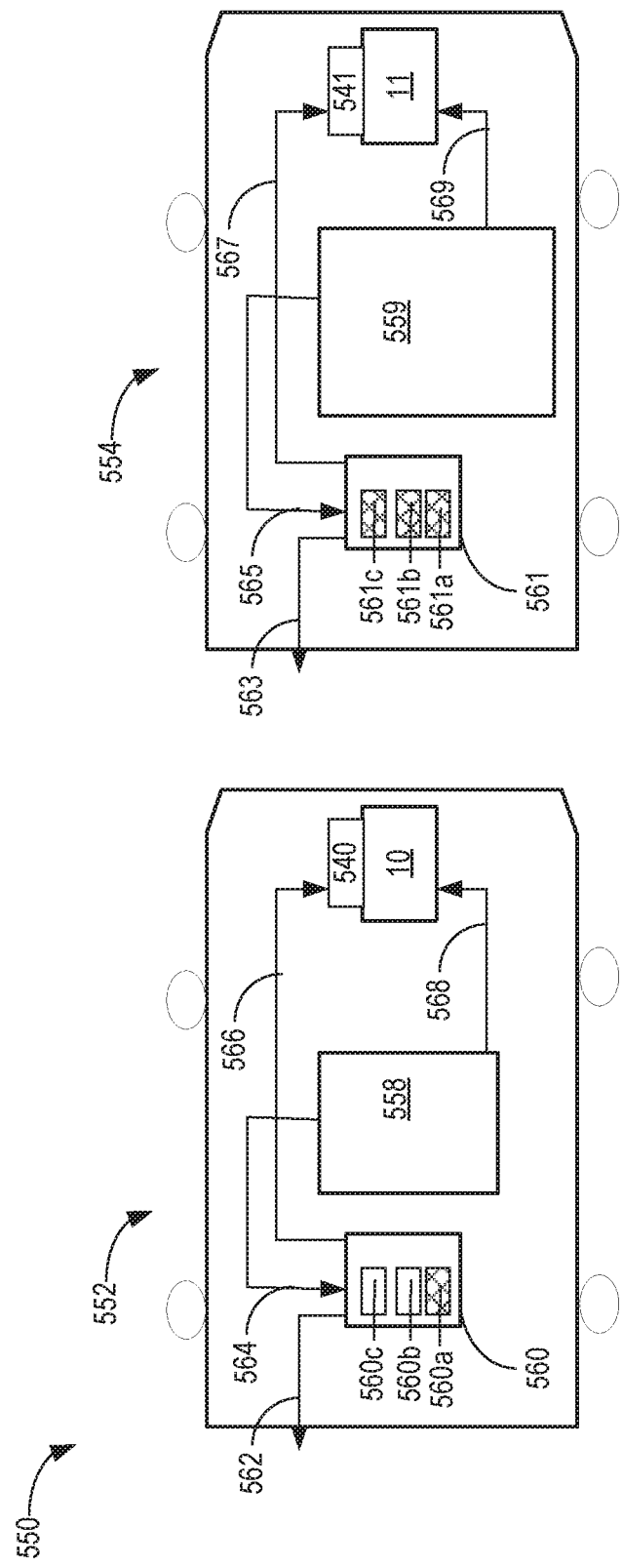
FIG. 8 illustrates two vehicles with different sized fuel tanks and different bleed emission trapping capacity.
Figure 9:
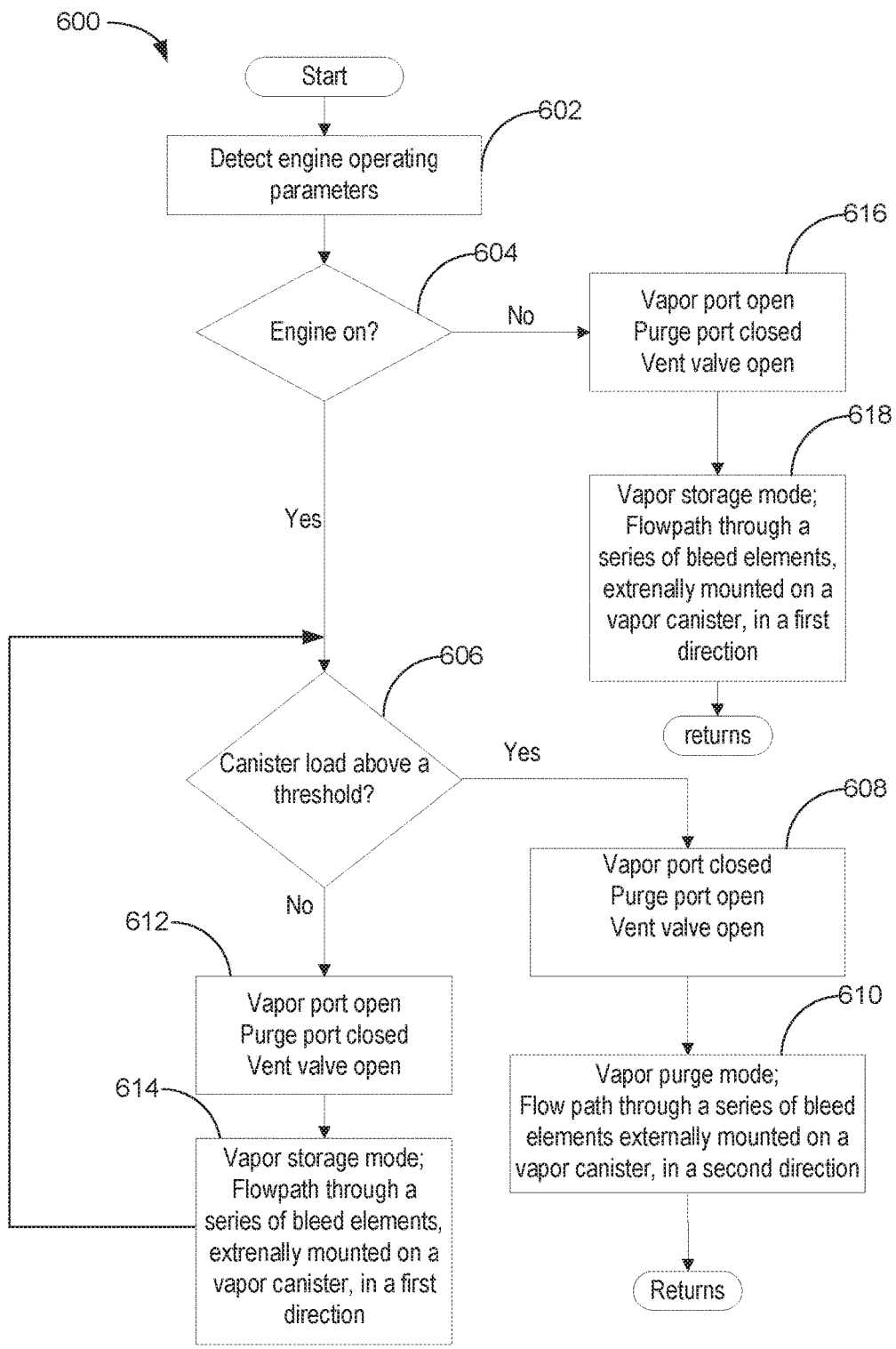
FIG. 9 shows an example method of purging trapped hydrocarbons from a vapor canister with externally mounted bleed element shells.
Figure 10:
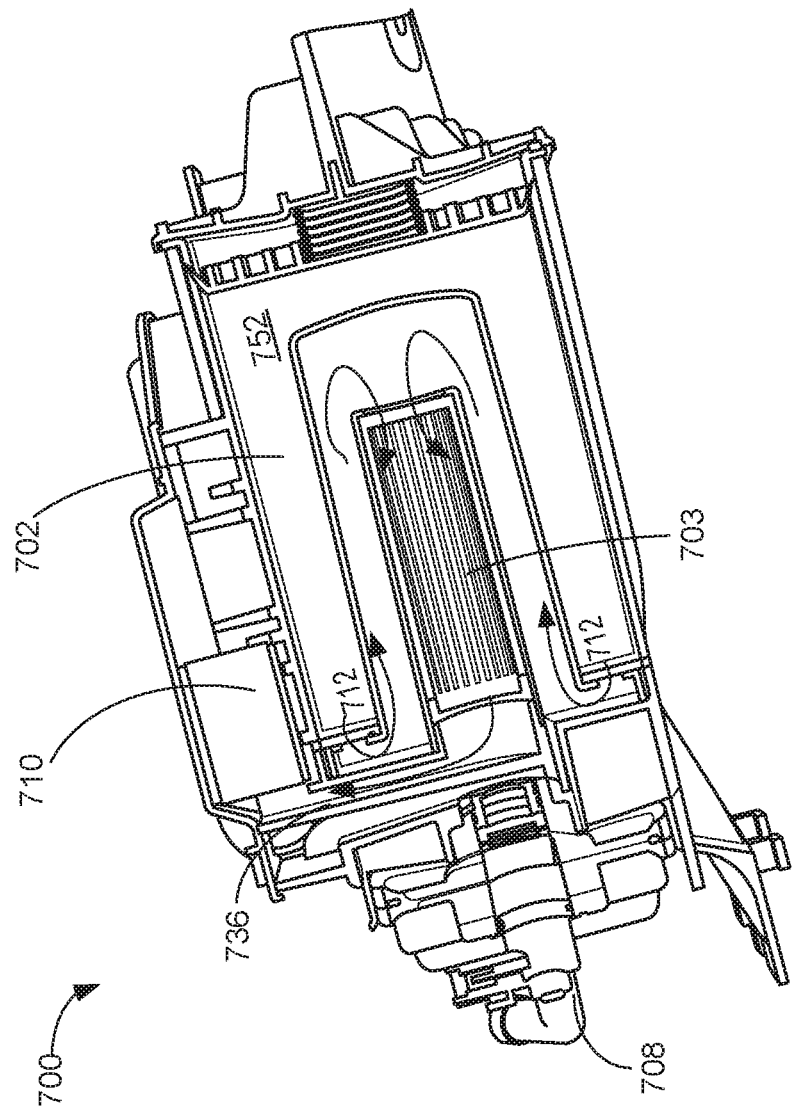
FIG. 10 shows a cross-sectional view of a vapor canister with externally coupled bleed element shells fluidically connected to an internal bleed element inside the vapor canister.
Figure 11:
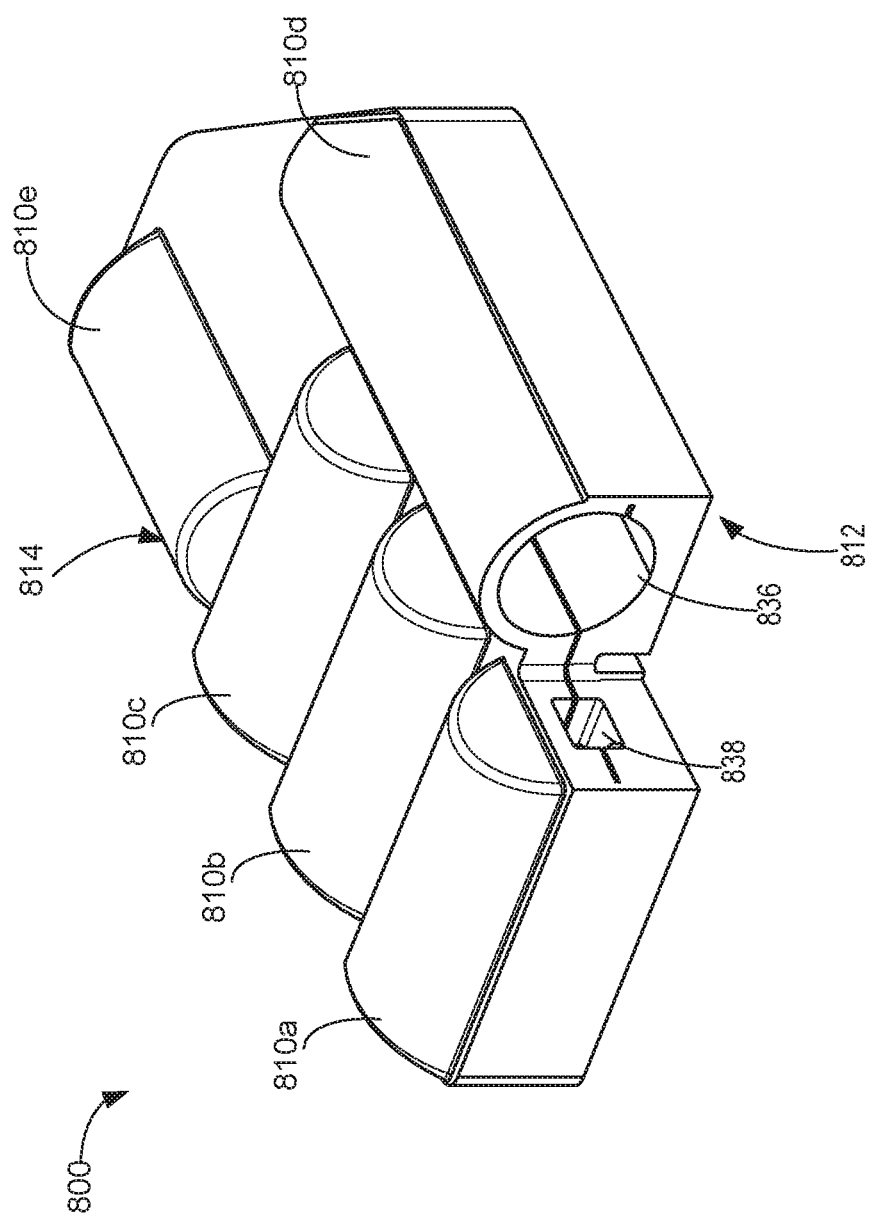
FIG. 11 shows a perspective view of a bleed element cartridge holder with a series of fluidically coupled bleed element shells.

The present description relates to a fuel vapor canister for controlling evaporative emissions in a vehicle with an engine and fuel system such as that shown in FIG. 1. More particularly, the present disclosure relates to a vapor canister with a series of fluidically coupled, externally mounted bleed element shells on an outside wall of the vapor canister, with flow conduits connecting the series of bleed element shells to a vent port on the vapor canister and to an inside chamber of the vapor canister, as illustrated in FIGS. 2 and 3. FIGS. 4 and 5 show sectional views of a three chamber vapor canister. Example flow paths through a vapor canister with a series of fluidically coupled, externally mounted bleed element shells are shown during vapor storage mode and vapor purging mode in FIGS. 6 and 7. FIG. 8 illustrates schematics of two vehicles, each vehicle with a fuel tank and a variable capacity bleed emission trapping vapor canister. An example method for trapping and purging fuel vapors from a vapor canister with externally mounted bleed element shells is shown in FIG. 9. FIG. 10 illustrates an embodiment of a vapor canister with an internal bleed element in addition to a series of fluidically coupled external bleed elements coupled to a sidewall of the vapor canister. A bleed element cartridge holder with a series of molded, fluidically coupled bleed element shells is illustrated in FIG. 11. FIG. 12 shows a schematic of fluidic coupling between a vapor canister and a bleed element cartridge holder external to the vapor canister. FIGS. 2-5 and FIGS. 10-11 are drawn approximately to scale, although various modifications in the relative sizing of one or more components may be made.

FIG. 1 shows a schematic depiction of an engine system 8 coupled in a vehicle system 9. In one example, vehicle system 9 may be a hybrid vehicle system. Engine system 8 may include an engine 10 having a plurality of cylinders 30. The cylinders 30 may receive intake air from an intake manifold 43 via an intake passage 42 and may exhaust combustion gases to an exhaust manifold 49 and further to the atmosphere via an exhaust passage 35. The intake air received in the intake passage 42 may be cleaned upon passage through an intake air cleaner 56.

The intake passage 42 may include a throttle 64. In this particular example, the position of the throttle 64 may be varied by a controller 12 via a signal provided to an electric motor or actuator included with the throttle 64, a configuration that is commonly referred to as electronic throttle control (ETC). In this manner, the throttle 64 may be operated to vary the intake air provided to the plurality of cylinders 30. The intake passage 42 may include a mass airflow sensor 118 and a manifold air pressure sensor 122 for providing respective signals MAF and MAP to the controller 12.

An emission control device 70 is shown arranged along the exhaust passage 35. The emission control device 70 may be a three way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio. An exhaust gas sensor 126 is shown coupled to the exhaust manifold 49 upstream of the emission control device 70. The exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. It will be appreciated that the engine system 8 is shown in simplified form and may include other components.

A fuel injector 66 is shown coupled directly to the cylinder 30 for injecting fuel directly therein in proportion to a pulse width of a signal received from the controller 12. In this manner, the fuel injector 66 provides what is known as direct injection of fuel into the cylinder 30. The fuel injector may be mounted in the side of the combustion chamber or in the top of the combustion chamber, for example. Fuel may be delivered to the fuel injector 66 by a fuel system 40. In some embodiments, cylinder 30 may alternatively or additionally include a fuel injector arranged in intake manifold 43 in a configuration that provides what is known as port injection of fuel into the intake port upstream of the cylinder 30.

Engine system 8 is shown coupled to fuel system 40 which includes a fuel tank 44 coupled to a fuel pump 21 and a fuel vapor canister 22. Fuel tank 44 receives fuel via a refueling line 48, which acts as a passageway between the fuel tank 44 and a fuel door 62 on an outer body of the vehicle. During a fuel tank refueling event, fuel may be pumped into the vehicle from an external source through refueling inlet 107. During a refueling event, while fuel is pumped into fuel tank 44, one or more fuel tank vent valves may be opened to allow refueling vapors to be directed to, and stored in, canister 22.

Fuel pump 21 is configured to pressurize fuel delivered to fuel injectors of engine 10, such as fuel injector 66. While only a single fuel injector 66 is shown, additional injectors are provided for each cylinder. It will be appreciated that fuel system 40 may be a return-less fuel system, a return fuel system, or various other types of fuel system.

Vapors generated in fuel tank 44 may be routed to fuel system canister 22, via conduit 31, before being purged to intake passage 42. Fuel tank 44 may include one or more fuel tank vent valves for venting diurnals and refueling vapors generated in the fuel tank to fuel system canister 22. The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). In the depicted example, fuel tank 44 includes a passive fuel level vent valve (FLVV) 108 that includes a float mechanism 46 which, when displaced by fuel, shuts off the vapor flow between the fuel tank and the canister. Thus, based on a fuel level 201 relative to vapor space 104 in the fuel tank, the vent valve may be open or closed. For example, FLVV 108 may be normally open allowing fuel tank overfilling to be prevented. During fuel tank refilling, when a fuel level 201 is raised, FLVV 108 may close, causing pressure to build in vapor line 109 (which is downstream of refueling inlet 107 and coupled thereon to conduit 31) as well as at a filler nozzle coupled to the fuel pump. The increase in pressure at the filler nozzle may then trip the refueling pump, stopping the fuel fill process automatically, and preventing overfilling.

Fuel system canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to intake passage 42, downstream of throttle 64, via purge line 28 by opening canister purge valve 112. While a single fuel vapor canister 22 is shown in FIG. 1, it will be appreciated that fuel system 40 may include any number of canisters.

In embodiments where engine system 8 is coupled in a hybrid vehicle system, the engine may have reduced operation times due to the vehicle being powered by engine system 8 during some conditions, and by a system energy storage device under other conditions. While the reduced engine operation times reduce overall carbon emissions from the vehicle, they may also lead to insufficient purging of fuel vapors from the vehicle's emission control system. To address this, in some embodiments, a fuel tank isolation valve (FTIV) 116 may be optionally included in conduit 31 such that fuel tank 44 is coupled to canister 22 via FTIV 116. When included, the isolation valve may be kept closed during engine operation to limit the amount of diurnal vapors directed to canister 22 from fuel tank 44. During refueling operations, and selected purging conditions, the isolation valve may be temporarily opened e.g., for duration, to direct fuel vapors from the fuel tank 44 to canister 22. By opening the valve when the fuel tank pressure is higher than a threshold (e.g., above a mechanical pressure threshold of the fuel tank above which the fuel tank and other fuel system components may incur mechanical damage), the fuel tank vapors may be released into the canister and the fuel tank pressure may be maintained below pressure threshold.

The fuel vapor canister 22 may be fluidically coupled to a vent line 27 for routing gases out of the canister 22 to the atmosphere when storing, or trapping, fuel vapors from fuel tank 44 (also termed, refueling flow). Vent line 27 may also allow fresh air to be drawn into fuel vapor canister 22 when purging stored fuel vapors to intake passage 42 via purge line 28 and canister purge valve 112. Flow through vent line 27 may be controlled by a canister vent valve 114 to adjust a flow of air and vapors between canister 22 and the atmosphere. In one example, canister vent valve 114 may be a three-way valve capable of switching between storage (or refueling) flow and purge flow. For example, the canister vent valve 114 may be switched to a first position during fuel vapor storing operations (for example, during fuel tank refueling and while the engine is not running) so that air, stripped of fuel vapors after having passed through the canister, can be pushed out to the atmosphere. Likewise, during purging operations (for example, during canister regeneration and while the engine is running), the canister vent valve 114 may be switched to a second position to allow a flow of fresh air to strip the fuel vapors stored in the canister. By closing canister vent valve 114, the fuel tank may be isolated from the atmosphere. While this example shows vent line 27 communicating with fresh, unheated air, various modifications may also be used. The canister vent valve 114 may also be used for diagnostic routines.

One or more pressure sensors 120 may be coupled to fuel system 40 for providing an estimate of a fuel system pressure. In one example, the fuel system pressure is a fuel tank pressure, wherein pressure sensor 120 is a fuel tank pressure sensor (or fuel tank pressure transducer FTPT) coupled to fuel tank 44 for estimating a fuel tank pressure or vacuum level. While the depicted example shows pressure sensor 120 coupled between fuel tank 44 and canister 22, in alternate embodiments, the pressure sensor may be directly coupled to fuel tank 44.

Fuel vapors released from canister 22 during a purging operation may be directed into the engine intake downstream of throttle 64 via purge line 28. The flow of vapors along purge line 28 may be regulated by canister purge valve 112, coupled between the fuel vapor canister 22 and the engine intake passage 42. The quantity and rate of vapors released by the canister purge valve 112 may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. Controller 12 may thus regulate flow from the fuel vapor canister 22 to the intake passage 42 while canister vent valve 114 positioned in the vent line 27 may be controlled by the controller 12 to regulate the flow of air and vapors between the fuel vapor canister 22 and the atmosphere. By commanding the canister purge valve 112 to be closed, the controller may seal the fuel vapor recovery system from the engine intake.

An estimate of the mass airflow (MAF) may be obtained from MAF sensor 118 coupled to intake passage 42, and communicated with controller 12. Alternatively, MAF may be inferred from alternate engine operating conditions, such as manifold pressure (MAP), as measured by a MAP sensor 122 coupled to the intake manifold. During purging operation, a purge air mass may be measured by the engine MAF sensor 118 or referenced from calibrated inferred purge air mass table values. If not measured by the MAF sensor, purge air mass from the atmosphere entering the canister may be inferred from bench flow data populated in PCM strategy purge air mass tables. Hydrocarbon or oxygen sensor outputs may be used to determine a purge air hydrocarbon concentration, which is then, controlled using engine air-to-fuel ratio feedback PCM algorithms. In alternate embodiments, an inline sensor and a feed-forward strategy may be used to measure the hydrocarbon concentration of the purge air. The in-line sensor may be located in intake manifold 43. Alternatively, the in-line sensor may be configured to sense the hydrocarbon concentration in the incoming purge air received within the purge line 28. In response to receiving purge vapors into the intake passage 42, an air/fuel ratio may be modified by controller 12.

Fuel system 40 may be operated by controller 12 in a plurality of modes by selective adjustment of the various valves and solenoids. For example, the fuel system may be operated in a fuel vapor storage mode wherein the controller 12 may close canister purge valve (CPV) 112 and open canister vent valve (CVV) 114 and fuel tank isolation valve (FTIV) 116 to direct refueling and diurnal vapors into canister 22 while preventing fuel vapors from being directed into the intake manifold.

As another example, the fuel system may be operated in a canister purging mode (e.g., after an emission control device light-off temperature has been attained and with the engine running), wherein the controller 12 may open CPV 112, CVV 114, and close FTIV 116. By closing the FTIV, the canister can be purged more efficiently during the limited engine-on time that is available in a hybrid vehicle. During the canister purging mode, vacuum generated by the intake manifold of the operating engine may be used to draw fresh air through vent line 27 and through fuel system canister 22 to purge the stored fuel vapors into intake passage 42. In this mode, the purged fuel vapors from the canister are combusted in the engine. The purging may be continued until the stored fuel vapors amount in the canister is below a threshold or until the engine is deactivated and an electric mode of vehicle operation is resumed.

During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel system canister. In another embodiment, at an appropriate time after key off, a controller may "wake up" and determine the current load present in a fuel system canister based on inputs from sensors. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). In another example, the fuel system canister load may be based on the number and duration of refueling events that have occurred following a previous canister-purging event.

Vehicle system 9 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas (air/fuel ratio) sensor 126 located upstream of the emission control device, exhaust temperature sensor 128, MAF sensor 118, and exhaust pressure sensor 129. Other sensors such as additional pressure, temperature, air/fuel ratio, and composition sensors may be coupled to various locations in the vehicle system 9. As another example, the actuators may include fuel injector 66, CPV 112, CVV 114, FTIV 116, and throttle 64. The control system 14 may include a controller 12. The controller may receive input data from the various sensors, process the input data, and trigger the actuators in response to the processed input data based on instruction or code programmed therein corresponding to one or more routines.

Referring now to FIG. 2, an embodiment of a fuel vapor canister 200 with a plurality of externally mounted bleed element shells is illustrated. Fuel vapor canister 200 is one non-limiting example of canister 22 of FIG. 1. The fuel vapor canister 200 may include a wall 203 with three ports. A vapor port 204 may receive fuel vapors from a connected fuel tank. A vent port 208 may connect the fuel vapor canister 200 to the atmosphere and a vent valve 212 may regulate the flow of air through the vent port 208. A purge port 206 may connect the fuel vapor canister 200 to an engine intake to purge the fuel vapors trapped by an adsorbent material, such as carbon, inside the fuel vapor canister 200. In one example, the fuel vapor canister may be the canister 22 of FIG. 1, connecting through the vent port to the vent line 27 to the atmosphere, connecting through the purge port to the purge line 28 to the engine intake, and connecting through the vapor port to the vapor conduit 31 to the fuel tank 40.

In the embodiment of the fuel vapor canister 200 illustrated in FIG. 2, a sidewall 202, perpendicular and adjacent to the wall 203 of the fuel vapor canister 200, includes a fluidically coupled series of five externally mounted bleed element shells 210, including bleed element shells 210a, 210b, 210c, 210d, and 210e. The bleed element shells 210 may be fluidically coupled to each other in a series and may be in fluidic communication with the fuel vapor canister and with atmosphere. In one embodiment, the series of bleed element shells 210 may be integrated to the canister sidewall 202. The bleed element shells 210 may be integrated to the canister sidewall 202 as it has a larger surface area, providing more packaging space for the bleed element shells 210, compared to the wall 203 or a wall 205, opposite the wall 203 and is not obstructed by the presence of fuel lines and other adjoining structures around the fuel vapor canister.

The bleed element shells coupled to the canister sidewall 202 may be closer to the vent port 208 on the wall 203 of the fuel vapor canister and farther from the vapor port 204 and the purge port 206. The proximity of the bleed element shells to the vent port may provide for establishing fluidic connection with the vent port and for capturing diurnal bleed emissions from the fuel vapor canister and preventing the bleed emissions from escaping through the vent port to the atmosphere.

The series of bleed element shells may be fluidically coupled such that a fluid flowing through a first bleed element shell may exit the first bleed element shell and flow into a second bleed element shell of the series. Similarly, the fluid exiting the second bleed element may enter a third fluidically coupled bleed element in the series. In the embodiment illustrated in FIG. 2, the series of bleed element shells includes five bleed element shells. In one example, fluidic coupling between the bleed element shells may be in the order where the bleed element shell 210d connects to the bleed element shell 210e, the bleed element shell 210e connects to the bleed element shell 210c, the bleed element shell 210c connects to the bleed element shell 210b, and the bleed element shell 210b connects to the bleed element shell 210a, as indicated by arrows 215.

The series of bleed element shells may be fluidically coupled to the vent port through a first bleed element of the series of bleed element shells and a last bleed element of the series may fluidically connect to the chamber inside the fuel vapor canister. The fluidic communication between the vent port and an inside chamber of the fuel vapor canister may be through the series of externally mounted bleed element shells. For example, the vent port may direct airflow from the atmosphere through the vapor canister wall to the series of externally mounted bleed element shells. The fluid flow exiting the series of bleed element shells may pass through the canister wall to the chamber inside the fuel vapor canister. Similarly, the flow of vapors from inside the fuel vapor canister may be directed through the canister wall to the series of bleed element shells and the vapors exiting the series of bleed element shells may flow through the canister wall to the connected vent port.

The bleed element capacity of the vapor canister 200 may be varied by changing the number of bleed element shells in the fluidically coupled series integrated on the sidewall of the vapor canister, for example, the vapor canister may include a series of five bleed element shells as illustrated, it may include a series of six bleed element shells, or other suitable configuration. The bleed element capacity may be further varied by filling some or all of the bleed element shells in the series with adsorbent material. The variable capacity of the bleed element shells may provide for meeting emission guidelines and for trapping bleed emissions from different sized fuel tanks. For example, a larger fuel tank may result in more diurnal emissions during the inactive state compared to a smaller fuel tank, thus utilizing additional bleed emission trapping capacity.

Referring to FIG. 2, five bleed element shells are present on the canister sidewall 202. The bleed element shells may be cylindrical. The diameter and the length of the cylindrical shell may be varied to increase or decrease the volume of the shell, thereby increasing or decreasing the amount of adsorbent material that may be accommodated inside the shell. In the embodiment illustrated in FIG. 2, a shell length Ls of the bleed element shell 210d may be more than the shell length Ls of the bleed element shell 210a, while the shell lengths Ls of the bleed element shells 210a, 210b, and 210c may be identical.

In one example, the bleed element shells 210a, 210b, 210c may be similarly sized and may be placed in the same orientation, parallel to each other, while bleed element shell 210d may be larger than the bleed element shells 210a, 210b, or 210c and is positioned to occupy a space below the bleed element shells 210a, 210b, and 210c. The bleed element 210e is the farthest from the vent port 208 and the bleed element 210a is the closest to the vent port. Other configurations of the bleed element shells may be possible.

In further examples, more than five or less than five bleed element shells may be present on the canister sidewall 202.

The bleed element shells 210 may function to hold a hydrocarbon adsorbing material, such as carbon. In one example, the adsorbent material may be loosely packed inside a shell 230. In another example, a matrix inside the shell may accommodate the adsorbent material, for example, a honeycomb shaped matrix with the adsorbent material, increasing the surface area of the adsorbent material.

Referring to FIG. 3, a first sectional view 300 of the series of five bleed element shells 210 coupled externally to the vapor canister 200 is illustrated. The first sectional view of the bleed element shells 210 shows bleed elements including a hydrocarbon trapping material packed inside four bleed element shells, including a bleed element 310a packed in the bleed element shell 210a, a bleed element 310b packed in the bleed element shell 210b, and two bleed elements 310d and 310e packed inside the bleed element shells 210d, while no adsorbent material is present inside the bleed element shells 210c and 210e (e.g., bleed element shells 210c and 210e are empty). In one example, the trapping capacity of the bleed element shells may be increased by filling up all of the bleed element shells with hydrocarbon trapping material. In another example, all of the bleed element shells may be partially loaded with adsorbent material, while in other embodiments some bleed element shells may be filled to capacity while some may be partially loaded with hydrocarbon adsorbing material.

In one example, the bleed element shell 210d may be fluidically coupled through a first flow conduit 236 to the inside of the vapor canister 200 and the bleed element shell 210a may fluidically connect to the vent port 208 though a second flow conduit 238, as illustrated in FIG. 3. The first flow conduit 236 from the bleed element shells may pass through the vapor canister sidewall 202, connecting to a chamber interior of the vapor canister (illustrated in FIG. 4), fluidically coupling the interior of the vapor canister and the bleed element shell 210d. The bleed element shell 210a may fluidically couple to the vent port 208 through the second flow conduit 238 passing through the canister sidewall 202. The direction of fluid flow through the series of bleed element shells may be either from the vent port, through the bleed element shells and towards the canister, or from the chamber of the canister, through the bleed element shells, and towards the vent port 208, and will be described in further details with reference to FIGS. 6 and 7.

The bleed element shells 210 integrated to the canister sidewall 202 may be packaged within a frame rail 220. The frame rail 220 may include a frame bottom surface 222 in face-sharing contact with the canister sidewall 202 (e.g., the frame bottom surface may be the sidewall 202). In another example, the bleed element shells may be secured to the frame rail 220 and to the frame bottom surface 222, and the frame rail 220 and the frame bottom surface 222 may be mounted to the canister sidewall 202 of the vapor canister 200. In one example, the bleed element shells and the vapor canister 200 may partly share a common wall. That is, each bleed element shell may include an inner wall that is a common wall with or is otherwise in face-sharing contact with the sidewall 202. Alternatively, the bleed element shells may be mounted to the canister sidewall 202 of the vapor canister 200.

Each bleed element shell may comprise four walls protruding from the sidewall 202, two sidewalls, a top wall, and a bottom wall. Collectively, the canister sidewall 202, four shell walls, and frame rail outer cover 230 (shown in FIG. 2) form a hollow shell configured to house adsorbent material. In some examples, the adsorbent material may be housed in a modular bleed element housing configured to be housed by the bleed element shell (as shown in shell 210c). To allow flow of fuel vapors and/or fresh air through the bleed elements, each shell includes two openings, one in each sidewall. For example, shell 210e includes a first opening 232 and a second opening 234 opposite the first opening.

FIGS. 4 and 5 show additional sectional views of a vapor canister. FIG. 4 illustrates a second sectional view 400 of the vapor canister 200 with the vapor port 204, the purge port 206, and the vent port 208 and FIG. 5 illustrates a third sectional view 450 of the vapor canister 200 with the vapor port 204 and the vent port 208. The vapor canister includes three interior chambers, a first chamber 252, separated by a chamber wall 253 from an adjacent second chamber 254, and a third chamber 256. The second chamber 254 may be separated from the adjacent third chamber 256 by a chamber wall 255. In other examples, less than three or more than three chambers may be present in the vapor canister.

All three chambers of the vapor canister may be in fluidic communication with each other, allowing movement of fluids across the chambers. The chambers may be packed with a hydrocarbon adsorbing material such as carbon. The chamber walls 253 and 255 may be partial, allowing for fluidic communication between the adjacent chambers. The vapor port 204 and the purge port 206 may be in direct fluidic communication with the first canister chamber 252. The vent port 208 connecting to the atmosphere may be in fluidic communication with the third chamber 256 via the series of externally mounted bleed element shells mounted on the vapor canister wall, as previously described with reference to FIGS. 2 and 3.

The flow conduit 238 may be present from the vent port 208, through the canister wall, fluidically coupling with a first bleed element of a series of fluidically coupled bleed element shells. Similarly, the last bleed element of the series may be fluidically coupled to the vapor canister through the flow conduit 236 through the canister wall and into the vapor canister chamber, for example in to the third chamber 256 of the vapor canister 200. As shown in FIG. 5, the flow conduit 236 may be in fluidic communication with chamber 256 via a permeable partition 260.

Figure 6:
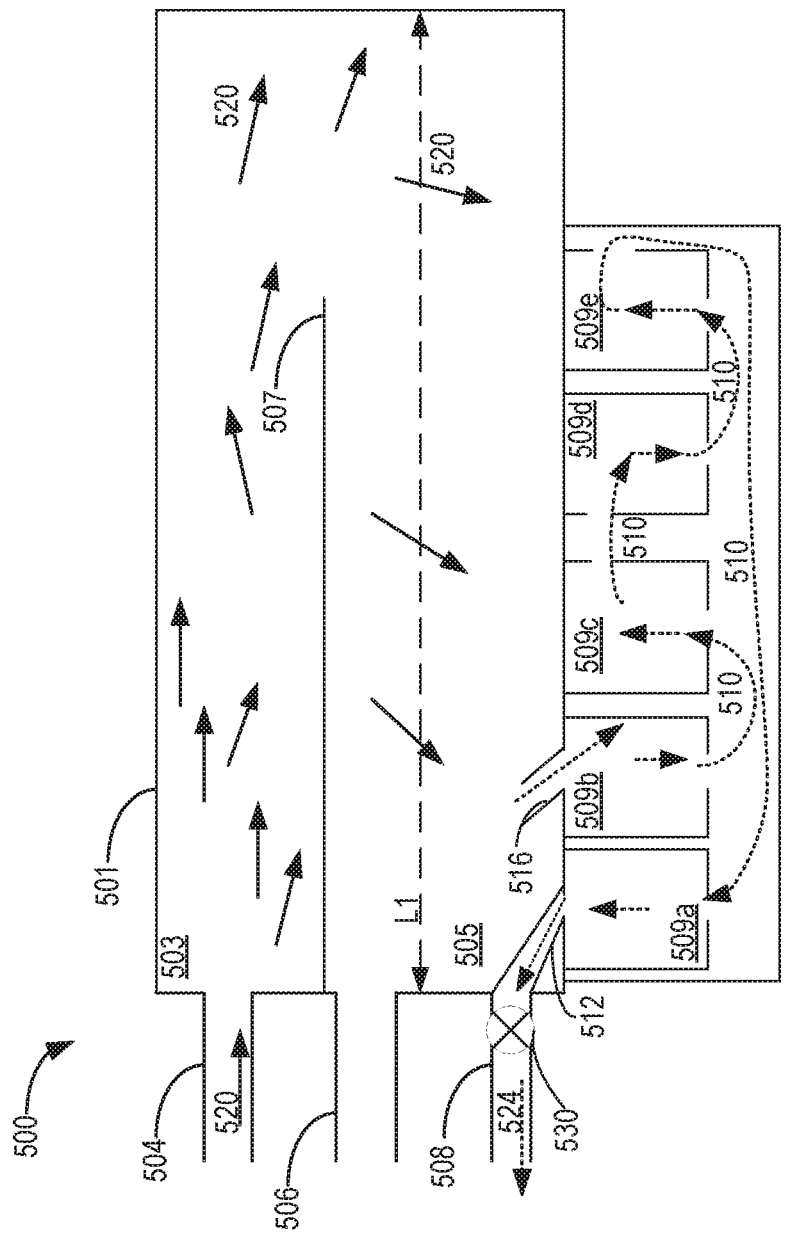
FIG. 6 shows a schematic of example flow paths through a vapor canister during fuel vapor storage mode.

The flow conduit 238 from the vent port may be adjacent to the chamber closest to the vent port. However, there may be no direct fluidic communication between the flow conduit 238 and the chamber of the vapor canister. The direction of flow along the flow conduits 236 and 238 may depend on whether the vapor canister is in a vapor storage mode or in a vapor purge mode, as will be discussed below with reference to FIGS. 6 and 7. FIGS. 6 and 7 show a schematic diagram 500, illustrating flow paths through a vapor canister 501 with a first chamber 503 and a second chamber 505, separated by a chamber wall 507. The vapor canister 501 may include a series of fluidically connected bleed element shells 509 (509a, 509b, 509c, 509d, and 509e), integrated on a sidewall of the vapor canister 501. A vapor port 504, a purge port 506, and a vent port 508 with an associated vent valve 530, are present on the vapor canister 501, similar to the vapor canisters described with reference to FIGS. 1-3. As described previously with reference to FIG. 1, during an engine inactive state, the vapor canister may be in a vapor storage mode. During vapor storage mode, the purge port of the vapor canister is not purging (e.g., a purge valve downstream of the purge port is closed and hence no flow of fluid occurs through the purge port) and the vent port is not drawing air from the atmosphere into the vapor canister.

During a vapor purging mode, when the engine is in a combustion state and a vapor canister purge is indicated, the purge port may be purging vapors from the canister to the engine intake and the vent port may be drawing air from the atmosphere into the canister. FIG. 6 illustrates schematic flow paths through the vapor canister and the coupled bleed element shells during a fuel vapor storage mode and FIG. 7 shows flow paths through the vapor canister and the bleed element shells during a vapor purging mode.

During fuel vapor storage mode, the fuel in the fuel tank releases fuel vapors that flow through the vapor port 504, along flow path 520 when the engine is not on, or operating in a non-combustion state in an electric vehicle. The vapor the vapor port 504 flows into the vapor canister first chamber 503 and may diffuse along the first chamber 503 and the second chamber 505, as indicated by the solid lines with arrowheads. The first chamber 503 and the second chamber 505 may be separated by the common chamber wall 507. The common chamber wall 507 may be present through length L1 of the vapor canister or may be partial, present along a part of the length L1 of the vapor canister. The first chamber 503 and the second chamber 505 may be in fluidic communication, allowing fluids to flow across the interconnected chambers. In some examples, the vapor canister may include one chamber. In another example, more than two, for example, three chambers may be present inside the vapor canister, as illustrated in FIGS. 4 and 5.

The chambers may contain an adsorbent material such as carbon for trapping the hydrocarbons from the fuel vapors. The hydrocarbons from the fuel vapors may be captured by the adsorbent material and may be purged from the canister during the vapor purging mode, as will be described below with reference to FIG. 9. However, during the inoperative state of the vehicle, some of the trapped emissions from vapor canister chambers may be released and these emissions may flow outside of the vapor canister 501, into the series of fluidically coupled bleed element shells 509, integrated on the outside wall of the canister.

As illustrated in FIG. 6, a flow conduit 516 may fluidically connect the vapor canister 501 to the external bleed element 509b, flowing the vapors from inside the vapor canister 501 to the bleed element shell 509b. The desorbed hydrocarbons in the vapors flowing from the canister to the bleed element shells may be trapped by the bleed elements as the vapors subsequently flow through the series of fluidically coupled bleed element shells along the flow path 510 as indicated by the dashed line with arrowheads. The vapors may exit the bleed element 509a though a flow conduit 512, fluidically coupling the bleed element shell 509a to the vent port 508.

The order of fluidic coupling of the bleed element shells to each other may be varied. In one example, the order of fluidic coupling may be influenced by the arrangement of the bleed element shells relative to each other on the sidewall of the vapor canister and relative to the flow conduits 512 and 516. Similarly, the bleed element shell coupling with the conduit 512 and the bleed element shell coupling with flow conduit 516 may vary, depending on the arrangement of the bleed element shells on the vapor canister wall. In one embodiment, in addition to the externally mounted bleed element shells, an internal bleed element may be present inside the vapor canister chamber, providing additional bleed emission trapping capacity, as described below with reference to FIG. 10.

A vent valve 530 may regulate the flow of fluids through the vent port 508, as previously described with reference to FIGS. 1 and 2. During vapor storage mode, the vent valve may be in a first position (e.g., open), directing vapors from the vent port to atmosphere. The vapors may exit the vent port along a flow path 524 and may be released to atmosphere. The plurality of bleed element shells may reduce the hydrocarbon content of the bleed emissions, trapping the hydrocarbons as the vapors flow past the multiple bleed element shells along flow path 510 before exiting through the vent port along the flow path 524. The remaining hydrocarbons still trapped in the adsorbent material in the vapor canister may be released and purged when the system is in a vapor-purging mode.

FIG. 7 shows flow path though the vapor canister during vapor purging conditions. In one example, during the vapor-purging mode, the flow of vapors from the fuel tank, through the vapor port into the canister may be blocked for the duration of purge mode for more efficient purging. A valve between the vapor port of the canister and the fuel tank may be positioned to block vapor inflow into the vapor canister, for example, the valve 116 shown in FIG. 1.

During the purging mode, the adsorbent material of the canister may have a high load of trapped hydrocarbons captured during the vapor trapping conditions. In one example, the canister hydrocarbon load may be over a specified threshold load, putting the system in vapor purging mode. The purging may be continued until the stored hydrocarbon amount in the canister is below a threshold or until the engine is shut off. During the vapor purging mode, vacuum generated by the intake manifold of the operating engine may be used to draw fresh air through the vent port 508, into the series of fluidically coupled bleed element shells 509 and inside the vapor canister, to purge the stored fuel vapors through the purge port 506, into a connected engine intake for combustion.

During the vapor purging mode, the vent valve 530 may be open and the vent port 508 may draw fresh air from atmosphere along the flow path 524, flowing through the flow conduit 512 into the bleed element shell 509a. The air flows through the series of fluidically bleed element shells along flow path 510, in the direction indicated by dashed lines with arrowheads. The air may exit the bleed element shell 509b and flow through the flow conduit 516 into the canister chamber. Fresh air flowing into the vapor canister may release the trapped hydrocarbons from the adsorbent material. The open purge port (e.g., open due to the canister purge valve being open) may draw the vapors and the released hydrocarbons along a flow path 522 through the purge port 506 towards the engine intake.

As explained previously, each bleed element shell may house a modular bleed element comprising adsorbent material. However, these modular bleed elements may be expensive and/or impose a restriction on the flow of air through the bleed element shells during purging. Thus, in some examples where the expected vapor load on the fuel vapor canister is relatively low, it may be desirable to leave one or more bleed shells empty. For example, vehicles with relatively small fuel tanks (e.g., passenger cars) may have a lower expected vapor load than vehicles with larger fuel tanks (e.g., trucks) due to the smaller volume of fuel in the smaller fuel tanks. Thus, in vehicles with smaller fuel tanks, some of the bleed shell elements may be left empty. Other parameters that may affect expected vapor load include the climate at which the vehicle is operated (e.g., temperate climates with minimal diurnal temperature swings may result in lower expected vapor loads than climates with large diurnal temperature swings).

FIG. 8 is a schematic diagram of a vehicle fleet 550 including a non-limiting example of a first vehicle 552 and a second vehicle 554, with a first fuel tank 558 and a second fuel tank 559, respectively. In one example, the first fuel tank 558 may have smaller volume than the second fuel tank 559. The first vehicle 552 includes a first vapor canister 560 and the second vehicle 554 includes a second vapor canister 561. The vapor canisters may each include a series of fluidically coupled externally mounted variable capacity bleed element shells 560a, 560b, and 560c, and 561a, 561b, and 561c. Each series of bleed element shells may be fluidically connected along a first flow path to a vent port on the vapor canister and along a second flow path to a chamber inside the vapor canister, the flow paths passing through the canister wall, as described previously with reference to FIGS. 2 and 3. The vapor canister 560 may receive fuel vapors along a vapor conduit 564 from the fuel tank 558. The vapor canister may connect to an engine intake 540 through a purge conduit 566 and the vapor canister 560 may connect to atmosphere through a vent conduit 562. The fuel tank may be connected to an engine 10 through a fuel line 568. The vapor canister 561 may receive fuel vapors along a vapor conduit 565 from the fuel tank 559. The vapor canister may connect to an engine intake 541 through a purge conduit 567 and the vapor canister 561 may connect to atmosphere through a vent conduit 563. The fuel tank may be connected to an engine 11 through a fuel line 569.

In one example, in the first vehicle 552, only the bleed element shell 560a may be filled with hydrocarbon trapping material to capture bleed emissions resulting from fuel vapors desorbed from the vapor canister 560. In contrast, in the second vehicle 554, all three bleed element shells 561a, 561b, and 561c may be filled with hydrocarbon trapping material as the larger fuel tank 559 may generate more fuel vapors, and hence more bleed emissions than the smaller fuel tank 558 of the first vehicle 552. In another example, two of the bleed element shells may be filled with hydrocarbon trapping material to capture bleed emissions resulting from an intermediate size fuel tank, larger than the fuel tank 558 and smaller than the fuel tank 559. In a further example, the number of bleed element shells fluidically coupled in the series may be varied depending on the size of the fuel tank.

FIG. 9 illustrates an example method 600 for trapping fuel vapors from a fuel tank and purging the trapped fuel vapors from a vapor canister with a series of fluidically coupled, externally mounted bleed element shells. The method 600 may include a vapor canister with a vapor port connecting to a fuel tank, a purge port connecting to an engine intake and a series of externally mounted bleed element shells fluidically connecting the vapor canister to a vent port. A controller may regulate the flow of fluid through the vapor port, the purge port, and the vent port by regulating the position of associated valves, such as a canister purge valve and vent valve, thereby regulating the flow path to and from the atmosphere to the canister. Method 600 will be described in reference to the systems described in FIGS. 1-5, though it should be understood that method 600 may be applied to other systems without departing from the scope of this disclosure. Method 600 may be carried out by a controller, such as controller 12 of FIG. 1, and may be stored as executable instructions in non-transitory memory.

The method 600 begins at 602 by detecting engine operating parameters, including engine operating mode, engine speed, engine temperature, exhaust temperature, and various ambient conditions, such as temperature, barometric pressure, humidity, etc.

Continuing at 604, method 600 may include determining whether the engine is on. For hybrid vehicles, and other vehicles configured to run in an engine-off mode, the method may include determining whether the engine is currently operating in a combustion mode or other such mode where purge gasses would be combusted upon entering the engine intake. In some examples, the vehicle may be configured to run with one or more cylinders de-activated. Depending on the vehicle and engine configuration, operating with one or more cylinders de-activated may be categorized as either engine-on or engine-off, depending on whether purge gasses would be combusted upon entering the engine intake.

At 604, if the engine is not operating, the method 600 proceeds to 616, where the vapor port is open, the vent port is open due to the vent valve being open and the purge port is closed due to the purge valve being closed. In one example, the vapor port and the purge port may be open and closed respectively by controlling the position of valve 116 along the flow conduit 31 and purge valve 112 along the purge line 28, as illustrated in FIG. 1. The vent valve at the vent port may remain open. The method 600 proceeds to 618, where the system is in a vapor storage mode, wherein fuel vapors from the fuel tank flow into the vapor canister through the open vapor port and are trapped inside the vapor canister. No vapors are purged as the purge port is closed. Some fuel vapors may be desorbed from the vapor canister during vapor storage mode, and may flow through the series of fluidically coupled external bleed element shells to the vent port. Method 600 then returns.

If engine is on, the method 600 proceeds to 606 to assess if canister vapor load is above a threshold. If the canister vapor load is not above a threshold, the adsorbent material in the vapor canister may have available vapor adsorbing capacity and the method 600 may proceed to 612, where the vapor port is open, and the purge port is closed and the vent valve at the vapor port continues to be open. The method 600 proceeds to 614, where the system is in a vapor storage mode, wherein fuel vapors flow into the vapor canister through the open vent port and are trapped inside the vapor canister. No vapors are purged as the purge port is closed. The vapors desorbed from the vapor canister, flow through the series of fluidically coupled external bleed element shells, towards the atmosphere through the vent port with the vent valve open. The method 600 may return to 606, after a specified amount of time, while the engine is still operating in the combustion mode or the method may return to 606 at the next engine start event.

If at 606 the vapor load of the vapor canister is above the threshold, the method 600 proceeds to 608, where the vapor port is closed and the purge port is open due to the canister purge valve being opened, connecting the vapor canister to an engine intake. The vent valve at the vent port is still open. The method proceeds to 610, a vapor purge mode, where the vapor flow from the fuel tank to the vapor canister may be suspended. The vent valve open at the vent port flows atmospheric air through the externally mounted bleed element shells, into the vapor canister. The atmospheric air strips the hydrocarbons from the adsorbent material in the series of bleed element shells and in the vapor canister, releasing the trapped hydrocarbons. The purge port is open, connecting the canister to the engine intake. The vacuum generated by the intake manifold of the operating engine may be used to draw vapors from the vapor canister through the purge port into the engine intake for combustion.

FIG. 10 illustrates a sectional view of an embodiment of a vapor canister 700 with a series of externally coupled bleed element shells 710 and an internal bleed element 703 inside a chamber 752 of the vapor canister 700. The internal bleed element 703 may provide bleed emission trapping capacity in addition to the bleed emission trapping capacity provided by the series of fluidically coupled external bleed element shells 710 on a sidewall 702 of the vapor canister 700.

The chamber 752 may fluidically connect to the internal bleed element 703. The internal bleed element 703 may include an adsorbent material that may trap hydrocarbons desorbed from the chamber 752. The desorbed hydrocarbons from the chamber 752 may flow along flow path 712, as indicated by lines with arrowheads to the internal bleed element 703. The internal bleed element 703 may fluidically connect through a flow conduit 736, passing through the canister sidewall 702 and connecting to a bleed element shell of the series of bleed element shells 710 coupled externally to the canister sidewall 702 of the vapor canister 700.

As described above with reference to FIGS. 2 and 3, the series of external bleed element shells may fluidically couple to a vent port of the vapor canister and to a chamber inside the vapor canister. In the embodiment of the vapor canister 700 illustrated in FIG. 10, a vent port 708 of the vapor canister 700 may fluidically couple through the series of external bleed element shells 710 to the internal bleed element 703 in the chamber 752 of the vapor canister. The direction of fluid flow within the vapor canister 700 may depend on the vapor canister being in a vapor storage mode or a vapor purge mode, as described above with reference to FIGS. 6 and 7. For example, in vapor storage mode, the desorbed fuel hydrocarbons from the chamber 752 may flow through the internal bleed element 703, out through the canister sidewall 202 and flow through the series of fluidically coupled external bleed element shells 710 and to the vent port 708. In vapor purge mode, atmospheric air may flow through the vent port, through the external bleed element shells 710 through the canister sidewall 702 into the internal bleed element 703 and to the chamber 752 of the vapor canister 700.

Referring now to FIG. 11, an embodiment of a bleed element cartridge holder 800 including a plurality of molded bleed element shells 810 is illustrated. Injection molding may be used to mold the bleed element cartridge holder 800. The bleed element cartridge holder 800 may be made of a lightweight moldable material, for example, foam or other thermosetting polymers. The bleed element shells 810a, 810b, 810c, 810d, and 810e may be fluidically coupled in a series. The inner molded structures defining the fluidically coupled bleed element shells 810 may be modified in the bleed element cartridge holder during the molding process, making the bleed element shells much more flexible. The bleed element cartridge holder may be molded to customize the number and size of bleed element shells and the airflow paths to accommodate the needs of different sized fuel tanks and to program hydrocarbon purge levels, as will be described in details below. The bleed element cartridge holder may also provide significantly improved resistance to vibration by cradling and securing the hydrocarbon adsorbing bleed elements inside the bleed element shells made with compressible material, such as foam.

In one example, the bleed element cartridge holder may include a foam insert defining a series of fluidically coupled bleed element shells, instead of molded structures. The foam insert may reduce the requirement for inner molded structure for defining the bleed element shells and make the bleed element shell configuration more flexible. The foam insert may be created to customize the number and sizes of bleed elements shells and airflow paths to accommodate the needs of different tank sizes.

The bleed element shells 810 may be molded such that the bleed element cartridge holder may have a flat surface 812. The flat surface 812 when in apposition with a second flat surface, for example, a sidewall of a vapor canister, may result in establishing of face sharing contact between the two flat surfaces. In contrast, the molded bleed elements shells provide an uneven surface 814, opposite the flat surface 812, which may not be in complete face sharing contact when in apposition with a flat surface. In one example, the surface opposite the flat surface 812 may be flat too.

In one example, the bleed element cartridge holder 800 may be mounted externally to a sidewall of a vapor canister, for example the sidewall of the vapor canister 22 in FIG. 1. The bleed element cartridge holder 800 may be mounted on the sidewall of the vapor canister such that the flat surface 812 may be in face sharing contact with the sidewall of the vapor canister. In another example, the bleed element cartridge holder may not be mounted on the vapor canister. However, fluidic communication between the bleed element cartridge holder 800 and the vapor canister may be established irrespective of whether the bleed element cartridge holder 800 is mounted to the vapor canister sidewall or not, as will be described in details below in reference to a schematic illustrated in FIG. 12.

The bleed element capacity of the bleed element cartridge holder may be varied for meeting emission guidelines and for trapping bleed emissions from different sized fuel tanks. In one example, the bleed element cartridge holder may include five molded fluidically coupled bleed element shells, as illustrated in FIG. 11. In another example, there may be a series of six molded bleed element shells, or other suitable configuration. The bleed element capacity may be further varied by filling some or all of the bleed element shells in the series with a hydrocarbon adsorbent material. In one example, the bleed element cartridge holder may be molded with the hydrocarbon adsorbent material sealed inside the bleed element shells. In another example, the hydrocarbon material may be added to the bleed element shells after the bleed element cartridge is molded.

Similar to the bleed element shells 210 illustrated in FIG. 2, the molded bleed element shells 810 may be cylindrical. The diameter and the length of the cylindrical shell may be varied to increase or decrease the volume of the bleed element shell, thereby increasing or decreasing the amount of adsorbent material that may be accommodated inside the shell. In one example, the bleed element shells 810a, 810b, 810c may be similarly sized and may be placed in the same orientation, parallel to each other, while bleed element shell 810d may be larger than the bleed element shells 810a, 810b, or 810c and is positioned to occupy a space below the bleed element shells 810a, 810b, and 810c. The bleed element shell 810e may be similar in size to the bleed element shell 810c and may be perpendicular in orientation relative to the bleed element shell 810c. Other configurations of the bleed element shells may be possible.

The bleed element shell 810d through a first opening 836 of the bleed element cartridge holder may be configured to fluidically couple to a vent port of the vapor canister (for example, the vent port 208 of the vapor canister 200). Similarly, a second opening 838 of the bleed element cartridge holder 800 at the bleed element shell 810a may be configured to fluidically connect to a chamber inside the vapor canister (for example, the chamber 256 in the vapor canister 200). Fluidic communication between a vapor canister and the bleed element cartridge holder external to the vapor canister may be established by connecting tubes or hoses to the first opening 836 and the second opening 838 to enable flow paths, as described below with reference to FIG. 12.

FIG. 12 is a schematic 900 showing a vapor canister 901 with a vent port 908 with a vent valve 930, a vapor port 904, and a purge port 906, similar to the vapor canister 501 with the three ports shown in schematic 500 in FIG. 6. The vapor canister 901 may include a first internal chamber 903 and a second internal chamber 905, separated by a partial wall 207. In other examples, the vapor canister 901 may include more than two or less than two internal chambers, filled with hydrocarbon trapping material to adsorb fuel vapors flowing in through the vapor port 904 connected to a fuel tank. Bleed emissions released from the internal chambers may be trapped by a series of external bleed element shells, fluidically coupled to the vapor canister.

An external bleed element cartridge holder 902 including a series of molded, fluidically coupled bleed element shells 909 (909a, 909b, 909c, 909d, 909e) is shown in FIG. 12. The bleed element cartridge holder 902 includes a flat surface 912 and an uneven surface 914, opposite the flat surface 912. In one example, the bleed element cartridge holder 902 may be mounted to a sidewall 920 of the vapor canister 901 where the flat surface 912 of the bleed element cartridge holder may be in face sharing contact with the sidewall 920 of the vapor canister 90.

Fluidic communication between the bleed element cartridge holder 902 and the vapor canister may be through a first opening 936 at the first bleed element shell 909a of the series of fluidically coupled bleed element shells and a second opening 938 at the last bleed element shell 909e of the series of fluidically coupled bleed element shells. The fluidic communication may be through a first tube 940, connecting the first opening 936 of the bleed element cartridge holder 902 to the vent port 908 of the vapor canister 901, establishing a leak free flow path. A second tube 942 may fluidically connect the second opening 938 to the internal chamber 905 of the vapor canister 901.

The first tube 940 and the second tube 942 may establish the fluidic communication between the bleed element cartridge holder 902 and the vapor canister 901, irrespective of whether the bleed element cartridge holder is mounted to the vapor canister sidewall. In one example, both the first tube 940 and the second tube 942 may pass through the canister sidewall, establishing fluidic connection between the bleed element cartridge holder 902 and the vent port 908, and the bleed element cartridge holder and the inside chamber 905 of the vapor canister, respectively. In other examples, only the first tube 940 may pass through the canister wall or only the second tube 942 may pass through the canister wall. In further examples, neither the first tube nor the second tube may pass through the canister wall as illustrated in the schematic in FIG. 12.

Fluid flow through the vent port 908 to the internal chamber 905 and from the internal chamber 905 to the vent port 908 of the vapor canister 901 may be along flow path 910 through the external bleed element cartridge holder 902, in the order indicated by arrows with dashed lines, through the bleed element shells 909. The direction of fluid flow through the bleed element cartridge holder fluidically connected to the vapor canister may depend on whether the canister is in a vapor storage mode or in a vapor purge mode, as discussed previously with reference to FIGS. 6 and 7. The schematic 900 shows fluid flow from the vent port 908 through the first tube 940, into the first opening 936 to the bleed element shell 909a, flowing through to bleed element shells 909b, 909c, 909d, 909e and exiting through the second opening 938, flowing through the second tube 942 to the internal chamber 905 of the vapor canister 901 during vapor storage mode. During vapor purge mode, the direction of fluid flow will be in the opposite direction, resulting in capture of bleed emissions by adsorbent material inside the bleed element shells 909 of the bleed element cartridge holder and preventing them from being purged to the atmosphere through the vent port 908.

Thus, the plurality of configurable, variable capacity bleed elements on the sidewall of the vapor canister may provide adequate bleed element capacity for effectively trapping bleed emissions during inactive engine conditions, preventing hydrocarbons from being released to the atmosphere. During purging mode, the atmospheric air flowing through the series of bleed elements and into the vapor canister may release the trapped hydrocarbons from the bleed elements and from the canister. The vapors along with the hydrocarbons may be drawn to the purge port of the vapor canister and may be purged to the engine intake system, thereby reducing emissions due to fuel tank vapors.

The technical effect of coupling a series of fluidically coupled, variable capacity bleed elements to an outside wall of a vapor canister includes providing adequate bleed emission trapping capacity for capturing bleed emissions from the vapor canister and purging the trapped hydrocarbons through an engine intake system for combustion, thereby preventing the bleed emissions from being released to atmosphere.

One example system includes a vapor canister having a first port connecting to a fuel tank, a second port connecting to an engine intake, a third port connecting to atmosphere and a series of fluidically coupled bleed element shells coupled externally to a sidewall of the vapor canister, wherein a first bleed element shell of the series of bleed element shells fluidically coupled to the third port through a first flow path passing through the sidewall of the vapor canister and to the first bleed element shell and a last bleed element shell of the series of bleed element shells fluidically coupled to a chamber inside the vapor canister through a second flow path passing through the sidewall into the chamber. A first example of the system includes, a purge valve at the second port of the canister, wherein the purge valve opening results in flow of fresh air through the third port, flowing though the series of fluidically coupled bleed element shells, through the canister wall, and into the chamber inside the vapor canister, and the purge valve closing results in flow of fuel vapors from the chamber, through the canister wall to the series of bleed element shells, to the third port, and to atmosphere. A second example of the system optionally includes the first example, and further includes, wherein at least one bleed element shell of the series of bleed element shells houses an adsorbent material. A third example of the system optionally includes one or more of the first and the second examples, and further includes, wherein the series of bleed element shells includes five fluidically coupled bleed element shells. A fourth example of the system optionally includes one or more of the first through third examples, and further includes, wherein the first bleed element shell of the series of bleed element shells is fluidically coupled to the third port and to a second bleed element shell of the series of bleed element shells, and the last bleed element shell of the series of bleed element shells is fluidically coupled to a fourth bleed element shell of the series of bleed element shells and to the chamber of the vapor canister. A fifth example of the system optionally includes one or more of the first through fourth examples, and further includes, wherein the second bleed element shell is fluidically coupled to a third bleed element shell, the third bleed element shell is fluidically coupled to the fourth bleed element shell. A sixth example of the system optionally includes one or more of the first through fifth examples, and further includes, wherein three of the bleed element shells of the series of bleed element shells house an adsorbent material, and wherein two of the bleed element shells of the series of bleed element shells are empty. A seventh example of the system optionally includes one or more of the first through sixth examples, and further includes, wherein five of the bleed element shells of the series of bleed element shells house an adsorbent material. An eighth example of the system optionally includes one or more of the first through seventh examples, and further includes, wherein the chamber of the vapor canister is connected through the first port to the fuel tank, is connected through the second port to the engine intake, and is connected through the third port to the atmosphere. A ninth example of the system optionally includes one or more of the first through eighth examples, and further includes, wherein the chamber of the vapor canister includes a bed of hydrocarbon trapping material to adsorb fuel vapors entering the chamber through the first port connected to the fuel tank. A tenth example of the system optionally includes one or more of the first through ninth examples, and further includes, wherein the first bleed element shell is cylindrical and has a first shell diameter and a first shell length, and wherein the series of bleed element shells includes a second bleed element shell that is cylindrical and has a second shell diameter equal to the first shell diameter and a second shell length equal to the first shell length. An eleventh example of the system optionally includes one or more of the first through tenth examples, and further includes, wherein the series of bleed element shells includes a third bleed element shell that is cylindrical and has a third shell diameter different than the first shell diameter and a third shell length different than the first shell length.

In one embodiment a system comprises a first fuel tank having a first volume and a first vapor canister coupled to the first fuel tank and including a first series of fluidically coupled bleed element shells externally mounted to the first vapor canister, the first series of bleed element shells including at least a first bleed element shell housing absorbent material and a second bleed element shell that is empty and a second vehicle having a second fuel tank having a second volume larger than the first volume, a second vapor canister coupled to the second fuel tank and including a second series of fluidically coupled bleed element shells externally mounted to the second vapor canister and each housing absorbent material. A first example of the system includes, wherein the first series of bleed element shells includes a same number of bleed element shells as the second series of bleed element shells. A second example of the system optionally includes the first example, and further includes, wherein the first vapor canister includes a first vapor port connecting to the first fuel tank, a first purge port connecting to a first engine intake of the first vehicle and a first vent port connecting to atmosphere and the second vapor canister includes a second vapor port connecting to the second fuel tank, a second purge port connecting to a second engine intake of the second vehicle and a second vent port connecting to the atmosphere. A third example of the system optionally includes one or more of the first and the second examples, and further includes, wherein the first vapor canister includes a first canister chamber with a hydrocarbon trapping material and the second vapor canister includes a second canister chamber with a hydrocarbon trapping material. A fourth example of the system optionally includes one or more of the first through third examples, and further includes, wherein the first canister chamber adsorbs fuel vapors flowing in through the first vapor port connecting to the first fuel tank and the second canister chamber adsorbs fuel vapors flowing in through the second vapor port connecting to the second fuel tank.

An example method for fuel vapor trapping and purging includes responsive to a first condition, positioning a vent valve of a vapor canister in a first position, flowing fluid from a chamber of the vapor canister through a canister wall of the vapor canister to a series of fluidically coupled bleed elements mounted to the canister wall, into a vent port of the vapor canister connecting to atmosphere and responsive to a second condition, maintaining the vent valve in the first position, flowing air from atmosphere through the vent port, through the canister wall into the series of fluidically coupled bleed elements, and into the chamber of the vapor canister. A first example of the method includes, during the first condition, maintaining a canister purge valve closed, and responsive to the second condition, opening the canister purge valve. A second example of the system optionally includes the first example, and further includes, wherein the first condition includes an engine not operating in a combustion mode and the second condition includes the engine operating in a combustion mode with a vapor load of the vapor canister above a threshold.

In another embodiment a system comprises a vapor canister having a first port connecting to a fuel tank, a second port connecting to an engine intake, a third port connecting to atmosphere and a bleed element cartridge holder external to the vapor canister with a series of molded, fluidically coupled bleed element shells, a first bleed element shell of the series of molded bleed element shells configured to fluidically couple to the third port of the vapor canister and a last bleed element shell of the series of molded bleed element shells configured to fluidically couple to a chamber inside the vapor canister. A first example of the system further comprising, a first tube fluidically coupling the first bleed element shell of the series of molded bleed element shells to the third port of the vapor canister and a second tube fluidically coupling the last bleed element shell of the series of molded bleed element shells to the chamber inside the vapor canister. A second example of the system optionally includes the first example, and further includes, wherein the bleed element cartridge holder is mounted on a sidewall of the vapor canister.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a vapor canister having a first port connecting to a fuel tank, a second port connecting to an engine intake, and a third port connecting to atmosphere;
   a series of fluidically coupled bleed element shells integrally molded externally to a sidewall of the vapor canister, wherein the bleed element shells and the vapor canister partly share a common wall, each bleed element shell having an inner wall that is a common wall with the sidewall of the vapor canister; and
   a first bleed element shell of the series of bleed element shells fluidically coupled to the third port through a first flow path passing through the sidewall of the vapor canister and to the first bleed element shell and a last bleed element shell of the series of bleed element shells fluidically coupled to a chamber inside the vapor canister through a second flow path passing through the sidewall into the chamber.

2. The system of claim 1, further comprising a purge valve at the second port of the canister, wherein the purge valve opening results in flow of fresh air through the third port, flowing through the series of fluidically coupled bleed element shells, through a canister wall, and into the chamber inside the vapor canister, and the purge valve closing results in flow of fuel vapors from the chamber, through the canister wall to the series of bleed element shells, to the third port, and to atmosphere.

3. The system of claim 1, wherein at least one bleed element shell of the series of bleed element shells houses an adsorbent material.

4. The system of claim 1, wherein the series of bleed element shells includes five fluidically coupled bleed element shells.

5. The system of claim 4, wherein the first bleed element shell of the series of bleed element shells is fluidically coupled to the third port and to a second bleed element shell of the series of bleed element shells, and the last bleed element shell of the series of bleed element shells is fluidically coupled to a fourth bleed element shell of the series of bleed element shells and to the chamber of the vapor canister.

6. The system of claim 5, wherein the second bleed element shell is fluidically coupled to a third bleed element shell, and the third bleed element shell is fluidically coupled to the fourth bleed element shell.

7. The system of claim 4, wherein three of the bleed element shells of the series of bleed element shells house an adsorbent material, and wherein two of the bleed element shells of the series of bleed element shells are empty.

8. The system of claim 4, wherein five of the bleed element shells of the series of bleed element shells house an adsorbent material.

9. The system of claim 1, wherein the chamber of the vapor canister is connected through the first port to the fuel tank, is connected through the second port to the engine intake, and is connected through the third port to the atmosphere.

10. The system of claim 9, wherein the chamber of the vapor canister includes a bed of hydrocarbon trapping material to adsorb fuel vapors entering the chamber through the first port connected to the fuel tank.

11. The system of claim 1, wherein the first bleed element shell is cylindrical and has a first shell diameter and a first shell length, and wherein the series of bleed element shells includes a second bleed element shell that is cylindrical and has a second shell diameter equal to the first shell diameter and a second shell length equal to the first shell length.

12. The system of claim 11, wherein the series of bleed element shells includes a third bleed element shell that is cylindrical and has a third shell diameter different than the first shell diameter and a third shell length different than the first shell length.

13. A system, comprising:
   a first vehicle comprising:
      a first fuel tank having a first volume; and
      a first vapor canister coupled to the first fuel tank and including a first series of fluidically coupled bleed element shells integrally molded externally to the first vapor canister, the first series of bleed element shells including at least a first bleed element shell housing adsorbent material and a second bleed element shell that is empty, wherein the first series of bleed element shells and the first vapor canister partly share a common wall, each bleed element shell comprising four walls protruding from a sidewall of the first vapor canister, two bleed element shell sidewalls, a top wall, and a bottom wall that is a common wall with the sidewall of the first vapor canister; and
   a second vehicle comprising:
      a second fuel tank having a second volume larger than the first volume; and
      a second vapor canister coupled to the second fuel tank and including a second series of fluidically coupled bleed element shells integrally molded externally to the second vapor canister and each housing adsorbent material, wherein the second series of bleed element shells and the second vapor canister partly share a common wall, each bleed element shell comprising four walls protruding from a sidewall of the second vapor canister, two bleed element shell sidewalls, a top wall, and a bottom wall that is a common wall with the sidewall of the second vapor canister.

14. The system of claim 13, wherein the first series of bleed element shells includes a same number of bleed element shells as the second series of bleed element shells.

15. The system of claim 13, wherein the first vapor canister includes a first vapor port connecting to the first fuel tank, a first purge port connecting to a first engine intake of the first vehicle, and a first vent port connecting to atmosphere; and wherein the second vapor canister includes a second vapor port connecting to the second fuel tank, a second purge port connecting to a second engine intake of the second vehicle, and a second vent port connecting to the atmosphere.

16. The system of claim 13, wherein the first vapor canister includes a first canister chamber with a hydrocarbon trapping material, and the second vapor canister includes a second canister chamber with a hydrocarbon trapping material.

17. The system of claim 16, wherein the first canister chamber adsorbs fuel vapors flowing in through a first vapor port connecting to the first fuel tank and the second canister chamber adsorbs fuel vapors flowing in through a second vapor port connecting to the second fuel tank.

18. A system, comprising:
a vapor canister having a first port connecting to a fuel tank, a second port connecting to an engine intake, and a third port connecting to atmosphere;
a series of molded, fluidically coupled, bleed element shells that are integrally molded externally to the vapor canister; and
a first bleed element shell of the series of molded bleed element shells configured to fluidically couple to the third port of the vapor canister and a last bleed element shell of the series of molded bleed element shells configured to fluidically couple to a chamber inside the vapor canister.

19. The system of claim 18, further comprising a first tube fluidically coupling the first bleed element shell of the series of molded bleed element shells to the third port of the vapor canister, and a second tube fluidically coupling the last bleed element shell of the series of molded bleed element shells to the chamber inside the vapor canister.

* * * * *